3,540,987
PURIFICATION OF PHTHALIC ANHYDRIDE BY BATCH DISTILLATION, ACCUMULATION AND CONTINUOUS DISTILLATION
Otto Garkisch, Frankfurt am Main, and Wolf Mehner, Konigstein, Taunus, Germany, assignors to Metallgesellschaft Aktiengesellschaft, Frankfurt am Main, Germany
Filed May 22, 1968, Ser. No. 731,210
Claims priority, application Germany, July 7, 1967, M 74,673
Int. Cl. B01d 3/10; C07c 63/18
U.S. Cl. 203—77               3 Claims

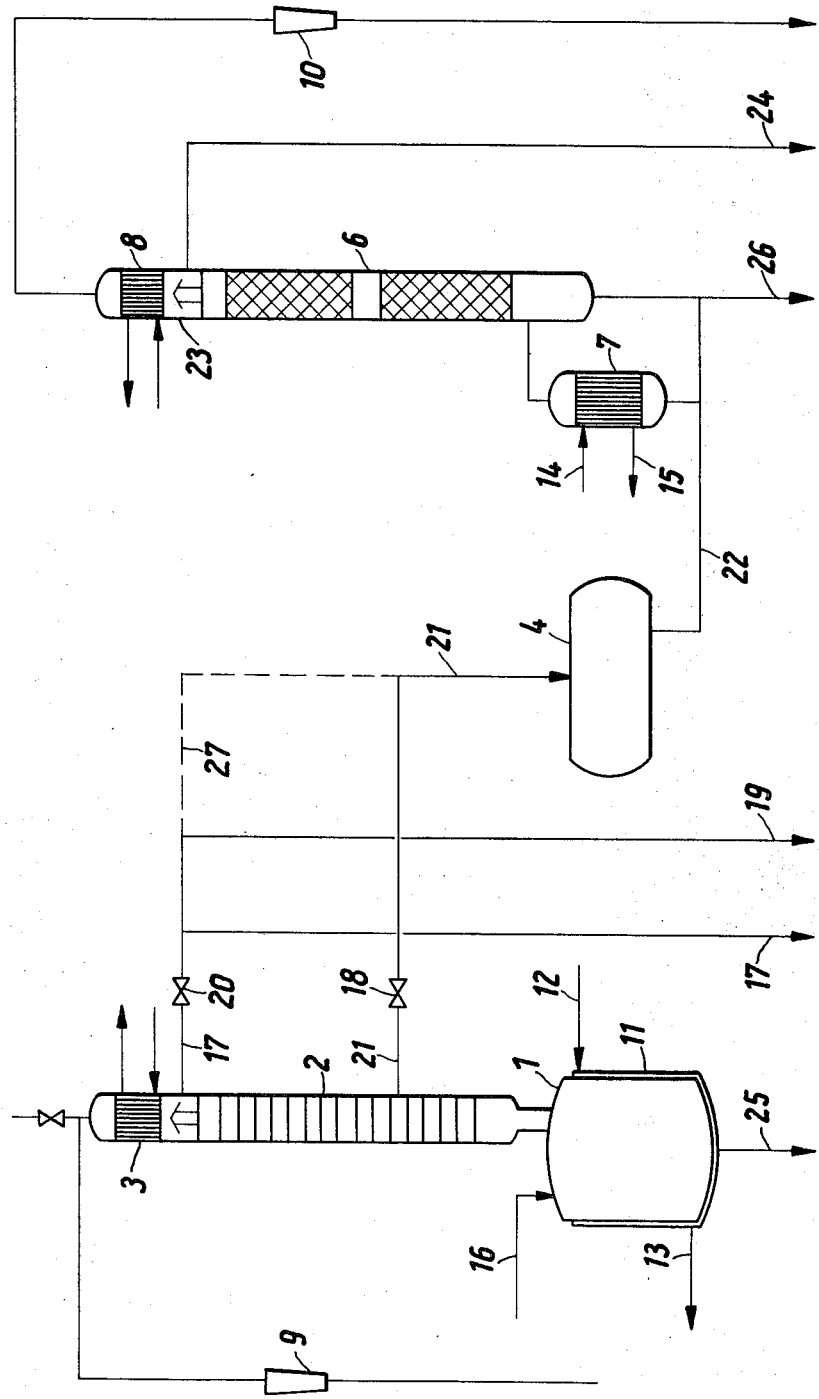

ABSTRACT OF THE DISCLOSURE

Naphthalene or o-xylene is batch distilled in a first stage to obtain prepurified phthalic anhydride which is then continuously distilled in a second stage to obtain purified phthalic anhydride.

---

Phthalic anhydride is produced by partial oxidation of naphthalene or o-xylene in numerous commercial plants and is an important product for the manufacture of plasticizers, alkyd resins, polyester resins, etc.

The oxidation of naphthalene, o-xylene and mixtures thereof results primarily in a crude oxidation product, which contains undesired by-products, which have lower or higher boiling points than phthalic anhydride or which are non-volatile. To produce pure phthalic anhydride (PA), the lower-boiling by-products as well as the residue consisting of the higher-boiling and non-volatile by-products must be carefully removed from the oxidation product.

The lower-boiling by-products include mainly maleic anhydride, benzoic acid, toluyl aldehyde and toluic acids. The higher-boiling by-products include mainly the various benzene tricarboxylic acids, derivatives of naphthoquinone and of antraquinone, and sulfonic acids. Depending on the starting material and its composition, the oxidation results also in the formation of different amounts of non-volatile substances from high polymers to coke.

Whereas the distillation appears to be simple, it involves the difficulty that even very small admixtures of the higher-boiling components of the oxidation product in PA result in unsatisfactory color numbers (Hazen number measured according to APHA) and that small admixtures of benzoic acid can be separated from PA only with difficulty. PA and benzoic acid form a non-ideal mixture. If one component is highly predominant in the mixture, the vapor pressure curves of the two substances will be close to each other.

Until some years ago, the distillative processing of the crude oxidation product obtained from naphthalene and o-xylene has been performed in batch operation owing to the difficulties pointed out heretofore. In one or two distillation stages, the low-boiling impurities were distilled over as first runnings and PA as main fraction and the high-boiling impurities were withdrawn as bottom product. Most of the world's production of PA is still performed this way.

Continuous processes for distilling the crude oxidation product, particularly that obtained from o-xylene, are also known. All these processes consist of a plurality of stages and none of them has enabled a distillation of PA from the residue to such a degree that the residue can be discarded without considerable loss, which adversely affects the economy of the process.

If only those components of the oxidation product which have a lower boiling point than PA are distilled off in the first distillation stage, PA and the higher-boiling components as well as the non-volatile components of the oxidation product enter the main column.

As the bottom product is progressively depleted in PA, the vapor pressure of the higher-boiling components of the oxidation product is increased so that these components cannot be kept from the distillation even if the reflux ratio is progressively increased. For this reason, a higher PA content amounting to more than 85% by weight in the distillate residue is usually tolerated in these continuous processes. This residue is then processed by a batch distillation with the aid of a still, and the distillate rich in PA is returned to the crude oxidation product which is charged to the first stage. The need for a following batch distillation is a great disadvantage. These plants involve high prime costs and do not require much fewer operators than plants for batch operation.

Besides, plants for continuous operation are rather sensitive to fluctuations in the quality of the feed oxidation product and for this reason involve considerable supervision and control expenditures.

For these reasons, the erection and operation of plants for a recovery of pure PA by continuous distillation with economic success is possible in most cases only for the large-scale processing of an oxidation product derived from o-xylene.

The processing of the oxidation product obtained from naphthalene results in a relatively large residue having a different nature. In this case, the plants for continuous operation are even more complicated and for this reason involve even higher prime and operating costs.

It has been found that the recovery of pure PA from the oxidation products obtained from o-xylene and/or naphthalene by multi-stage distillation can be greatly simplified and considerably improved in yield if first runnings, which can be divided into a plurality of fractions, are first distilled in batch operation from the crude oxidation product. PA is then virtually completely distilled over and transferred into a storage tank and is withdrawn from said tank and subjected to a continuous distillation, which yields an overhead product consisting of PA of highest purity.

The preceding batch distillation may be carried out under normal or subatmospheric pressure. The following continuous distillation is performed under subatmospheric pressure.

In the process of this invention, PA is distilled twice. The PA fed to the second stage is already free of lower-boiling impurities, contains higher-boiling impurities only in a very low concentration and is free of non-volatile substances, which would tend to clog the equipment. In practical operation, it is sufficient to withdraw part of the bottom product from the continuously operated, second distillation product in intervals of several months and to admix this bottom product to the crude oxidation product which is fed to the first distillation stage. This practice prevents an enriching of higher-boiling impurities at the bottom of the continuous distillation column. Owing to the small content of higher-boiling impurities and the absence of non-volatile impurities in the distillate obtained from the first stage, an expensive still is not required for the succeeding continuous distillation but a simple reboiler is entirely sufficient for this purpose.

The end product consisting of pure PA is discharged at a lower, uniform rate than in the known batch operation so that the following plants, for example, the product coolers in which the PA is deposited in flakes, and the packaging apparatus, may be simpler and less expensive.

Compared to the known continuous operation, the process of this invention has the advantage that the preceding batch stage can easily and quickly be adjusted to the properties of the oxidation product which is fed. This facilitates the processing of oxidation products obtained from naphthalene or o-xylene or from mixtures thereof. Besides, only slightly amounts of PA are recirculated in one or both stages in the process of this invention.

The means by which the objects of this invention are obtained are described more fully with reference to the accompanying drawing which shows a flow diagram of a plant for performing the process of this invention.

The plant consists essentially of a batch distillation first stage comprising a still 1, a column 2 and a condenser 3, moreover, of an intermediate heat insulated storage tank 4 and a continuous distillation second stage comprising a column 6, a reboiler 7 and a condenser 8.

The batch distillation may be carried out under subatmospheric pressure with the aid of an ejector 9. The vacuum for the second distillation stage is produced with the aid of an ejector 10.

The still 1 is surrounded by a heating jacket 11, which receives a heating fluid through an inlet 12 and discharges said fluid at an outlet 13. Heating fluid is supplied through an inlet 14 into the reboiler 7 of the second distillation stage and is withdrawn from the reboiler through an outlet 15. Both units are suitably heated in known manner with the aid of a liquid heating fluid.

The oxidation product to be processed is supplied at a temperature of about 150° C. through a supply conduit 16 into the still 1, where it is heated to about 250° C. The resulting decomposition products include water vapor and escape as overhead through the column 2 and the condenser 3 against atmospheric pressure, or are exhausted by the ejector 9. The condenser 3 is maintained at about 138° C. by evaporative cooling.

As soon as an equilibrium has been attained in column 2, a first running amounting to about 1–4% of the contents of the still is withdrawn through conduit 17.

In the processing of naphthalene oxidation product, the first running amounting from 2 to 3% by weight and consisting of a mixture of PA and maleic anhydride is added to the next following charge. In the processing of o-xylene oxidation product, two first running fractions are suitably withdrawn. The first of these fractions amounts from about 0.5 to 1% by weight and is withdrawn through conduit 17 by opening valve 20. The second fraction may have a considerable PA content and is returned by a conduit 19 to the oxidation product to be processed.

When the first runnings have been removed, prepurified PA is distilled off and transferred into the heat-insulated storage tank 4 through conduits 17, 19 and 27 or, where a smaller number of plates is employed, through a conduit 21 having valve 18. PA is transferred from the tank 4 through conduit 22 into the reboiler circuit of the second distillation stage. The pure PA withdrawn from the top of column 6 is condensed as a liquid in the condenser 8 consisting of an evaporative cooler and is discharged from a collecting tray 23 through a conduit 24 to a receiver.

The residue having a higher boiling point than PA is withdrawn from the still 1 through conduit 25 when one or more batches have been processed. When o-xylene oxidation product is processed, the distillation residue amounting to 0.5 to 1% by weight of the charge is so small that several charges may be processed before the residue is withdrawn. In the processing of naphthalene oxidation product, which contains about 4% by weight residue, the bottom product should be removed after each charge.

The PA which is distilled over and transferred into the tank 4 through conduit 21 or 27 is so pure that only a very small residue is formed at the bottom of the column 6 for continuous operation. It is sufficient to withdraw part of the bottom product through a conduit 26 in intervals of several months and to return said bottom product to the crude oxidation product.

The following examples serve for a more detailed explanation of the invention.

EXAMPLE 1

10,000 kg. crude oxidation product obtained from o-xylene was pumped into the still 1 and heated from 150° to 250° C. Small amounts of phthalic acid were decomposed into phthalic anhydride and water during the heating-up period. The water escaped overhead through column 2 and condenser 3. With full reflux and with the valve 20 closed, the equilibrium in the distillation column was attained. The valve 20 was then opened and the first running withdrawn through conduit 17 in an amount of 100 kg. and discarded while the reflux ratio was 30–40. At a lower reflux ratio of 10–12, 250 kg. were then distilled off and returned through conduit 19 to the crude oxidation product. Valve 20 was then closed and the valve 18 in conduit 21 opened. PA was now distilled over and transferred into the intermediate tank 4 while a reflux ratio of only 0.1 to 0.3 was maintained. The residue of 70 kg. remaining in the still 1 was withdrawn through conduit 25 and discarded.

The distillate was sucked from the tank 4 through conduit 22 into the reboiler 7 under the action of the vacuum in column 6 and was then evaporated. The PA was rectified once more in column 6, the top of which was maintained at 203° C. and 100 mm. mercury. The pure product was condensed in the cooler 8 and withdrawn from the bottom collecting chamber 23 through conduit 24. The reflux ratio in column 6 was 0.2 to 0.50. 9730 kg. PA of highest purity, having a Hazen number of 5–10, was recovered from the charge of 10,000 kg. oxidation product. Only 20 kg. PA was lost in the 70 kg. still residue.

The subatmospheric pressure was produced by the ejector 10. The condensers 3 and 8 were cooled by evaporating feed water at about 130° C. The still 1 and the reboiler 7 were heated with a heat transfer oil.

EXAMPLE 2

10,000 kg. oxidation product obtained from naphthalene was processed in the same plant. The oxidation product was heated to its boiling point of 285° C. in still 1 and distilled for 30 minutes with full reflux. 200 kg. of a first running which contains maleic anhydride were then withdrawn through conduit 17 and returned into the tank which held the crude oxidation product.

The valve 20 was then closed and the pressure slowly reduced by the ejector 9. The PA was now distilled and transferred through conduit 21 into the tank 4. During this phase, the pressure was reduced to 250 mm. mercury.

Just as described in Example 1, the distillate was transferred from tank 4 to the column 6 for the continuous distillation of pure PA, which was distilled as PA of highest purity at 203° C. and 100 mm. mercury at the top of the column. The PA of highest purity amounts to 9300 kg. and had a Hazen number of 5–10. 400 kg. distillation residue were withdrawn from still 1 through conduit 25.

Mixed crude oxidation products obtained from naphthalene and o-xylene can be similarly processed to obtain pure PA. In this operation, the same pressure and temperature conditions are maintained in the continuously operated, second stage as in the preceding examples. The adjustment to the special properties of the feed mixture is made only in the preceding batch stage.

EXAMPLE 3

10,000 kg. oxidation product of which 1/10 have been derived from naphthalene and 9/10 from o-xylene, and 300 kg. of the second fraction of the first runnings from the preceding charge were heated to 285° C. in still 1. When the equilibrium of distillation had been established with full reflux, the first fraction of the first runnings in an amount of 60 kg. was withdrawn through conduit 17 while operating at a high reflux ratio of 40 and discarded. The second fraction of the first runnings was then withdrawn in an amount of 300 kg. while operating at a reflux ratio of 8 and was returned by conduit 19 to the tank for crude oxidation product.

The valve 20 was closed and the ejector 9 operated to slowly reduce the pressure to 250 millimeters mercury. The resulting PA vapor was passed through conduit 21 into tank 4. 200 kg. of residue remained in the still and was drained when the vacuum had been broken or left to be combined with the next charge.

Just as described in Example 1, the PA was transferred into the pure PA column 6 and distilled therein. 10,000 kg. of crude oxidation product was processed to yield 9,640 kg. of pure PA having a Hazen number between 5 and 10. The loss of PA in the residue was about 65 kg.

Having now described the means by which the objects of this invention are obtained, we claim:

1. A process for recovering pure phthalic anhydride from the oxidation product of naphthalene and o-xylene comprising fractionally distilling said oxidation product by batch distillation in a first stage to separate successively a first fraction of lower boiling point impurities and a second fraction of prepurified phthalic anhydride from a residue of higher boiling point impurities, accumulating the batches of prepurified phthalic anhydride, and distilling said second fraction of prepurified phthalic anhydride in a second continuously operated distillation stage under subatmospheric pressure to recover pure phthalic anhydride as a top product.

2. A process as in claim 1 in which said first stage is operated under atmospheric pressure.

3. A process as in claim 1 in which said first stage is operated under subatmospheric pressure.

References Cited

UNITED STATES PATENTS

| | | | |
|---|---|---|---|
| 2,405,393 | 8/1946 | Atkins | 203—98 |
| 2,526,710 | 10/1950 | Thayer | 260—346.7 |
| 2,670,325 | 2/1954 | West et al. | 260—346.7 |
| 2,786,805 | 3/1957 | Sullivan et al. | 260—346.7 |
| 2,965,549 | 12/1960 | Hudkin | 203—74 |
| 2,995,500 | 8/1961 | Dilbert | 203—98 |
| 3,011,955 | 12/1961 | Brown | 260—346.7 |
| 3,178,452 | 4/1965 | Smith et al. | 260—346.4 |
| 3,187,016 | 6/1965 | Brown et al. | 260—346.7 |
| 3,280,009 | 10/1966 | Ackermann et al. | 260—346.7 |
| 3,380,896 | 4/1968 | Scheiber et al. | 203—77 |

FOREIGN PATENTS 1,227,443 10/1966 Germany.

WILBUR L. BASCOMB, JR., Primary Examiner

U.S. Cl. X.R.

202—154; 203—91, 99; 260—346.7